United States Patent [19]

May

[11] Patent Number: 5,279,859

[45] Date of Patent: * Jan. 18, 1994

[54] METHOD FOR COLORING FABRIC WITH CRAYON

[76] Inventor: Brian W. May, 2509 Kennelly Ct., Burnsville, Minn. 55337

[*] Notice: The portion of the term of this patent subsequent to Mar. 23, 2010 has been disclaimed.

[21] Appl. No.: 963,593

[22] Filed: Oct. 20, 1992

Related U.S. Application Data

[63] Continuation of Ser. No. 766,712, Sep. 27, 1991, Pat. No. 5,196,237.

[51] Int. Cl.$^5$ .................... B41M 1/40; C09D 11/12
[52] U.S. Cl. ........................... 427/288; 427/11; 106/19 B; 106/27 A; 106/31 R; 434/84; 264/330
[58] Field of Search ............... 106/19 B, 27A, 31R; 264/330; 427/288, 11; 434/84

[56] References Cited

U.S. PATENT DOCUMENTS

| | | | |
|---|---|---|---|
| 418,947 | 1/1890 | Hart | 106/19 B |
| 1,414,570 | 5/1922 | Hurley | 106/19 B |
| 2,560,195 | 7/1951 | Smith et al. | 106/19 B |
| 2,584,318 | 2/1952 | Allyn, Jr. | 106/19 B |
| 3,873,687 | 3/1975 | Demko | 106/19 B |
| 3,914,131 | 10/1975 | Hutchison | 106/19 E |
| 4,617,058 | 10/1986 | Lee | 106/19 B |
| 4,741,774 | 5/1988 | Lazar | 106/19 B |
| 4,990,013 | 2/1991 | Hejmanowski | 106/19 B |

OTHER PUBLICATIONS

"Grant & Hackh's Chemical Dictionary", 5th Ed., 1988, p. 110.

"The Condensed Chemical Dictionary", 4th Ed., 1950, p. 136.

S. Stinson, "New Colors Bring the Rainbow and More to Crayola's Palette", C&EN, pp. 19-21, (Feb. 11, 1991).

H. Bennett, "Introduction-Making Crayon", *The Chemical Formulary*, vol. VIII, p. 9 (1948).

H. Bennett, "Coatings-Fluorescent Paints", *The Chemical Formulary*, vol. IV, pp. 87-88 (1939).

H. Bennett, "Textile Marking Crayon (Washable)" *The Chemical Formulary*, vol. IV, p. 142 (1939).

H. Bennett, "Fluorescent Crayon" and Water Crayon, *The Chemical Formulary*, vol. IV, p. 150 (1939).

H. Bennett, "Impregnating Wax", *The Chemical Formulary*, vol. IV, p. 152 (1939).

H. Bennett, "Ink, Carbon Paper, Duplicators, Crayons, Etc.", *The Chemical Formulary*, vol. I, pp. 192-195 (1933).

H. Bennett, "Inks-Marking Crayon", *The Chemical Formulary*, vol. XIV, pp. 246-247 (1968).

H. Bennett, "Rubber, Resins, Plastics, and Waxes", *The Chemical Formulary*, vol. XI, pp. 286-287 (1961).

*Primary Examiner*—Helene Klemanski
*Attorney, Agent, or Firm*—Kinney & Lange

[57] ABSTRACT

A process for making a crayon that permanently colors fabric. The process includes combining Carnauba wax, a mixture containing triglycerides, stearic acid, and a coloring agent to form a crayon. The crayon of the present invention forms a bright, permanent mark when contacted with a fabric. The present invention further includes a method for adhering the crayon material to the fabric and permanently fixing the crayon material onto the fabric. The present invention additionally includes a kit that includes a plurality of the crayons of the present invention and an article made of fabric.

9 Claims, No Drawings

METHOD FOR COLORING FABRIC WITH CRAYON

This application is a continuation of application Ser. No. 07/766,712, filed Sep. 27, 1991, now U.S. Pat. No. 5,196,237.

BACKGROUND OF THE INVENTION

The present invention relates to crayons, and in particular, to crayons for coloring fabric.

A first box of crayons has, for generations of children, marked an initiation into the life of school and learning. For many children, it is a first experience of contacting paper with a writing instrument.

Crayons have historically contained a predominant concentration of paraffin, a wax such as Bee's wax or Carnauba wax, stearic acid and a non-toxic pigment to impart color. Crayons used in industry, however, do contain toxic pigments such as lead cromate.

The process by which the paraffin-based crayons are made includes mixing stearic acid and pigments with paraffin heated to 160° F. Once mixed, and further heated to 210°-250° F., the molten solution is added to molds. When cooled, the crayons are removed from molds and packaged. The process of making crayons has been described in Chemical & Engineering News, Feb. 11, 1991 at 20.

Another crayon writing instrument includes the marking crayon. Unlike the crayon described above, the marking crayon imparts color when contacted with materials other than paper, such as fabric. One formulation of marking crayons includes hard soap, Bee's wax crude, spermatic crude, carbon black, and Prussion Blue pigment as described in *The Chemical Formulary* (1948) edited by H. Bennett. Another formulation described in *The Chemical Formulary* includes a carbamate and stearate mixture.

Use of the marking crayon frequently requires the fabric surface to be conditioned before contact with the marking crayon. Conditioning includes moistening the fabric.

Other fabric marking instruments include markers containing volatile organic chemicals and chemicals imparting odor when used. These markers are not for use by children and do not confer a permanent, bright mark.

SUMMARY OF THE INVENTION

The present invention includes a process for combining Carnauba wax, a mixture containing triglycerides, stearic acid, and a coloring agent to form a crayon. The crayon product of the present invention forms a bright, permanent mark when contacted with a fabric. The present invention further includes a method for adhering the crayon material to the fabric and permanently fixing the crayon material onto the fabric. The present invention additionally includes a kit that includes a plurality of the crayons of the present invention and an article made of fabric.

DETAILED DESCRIPTION OF THE PREFERRED EMBODIMENTS

The present invention includes a process for making a permanent fabric marking crayon, a fabric marking crayon, a method for permanently adhering a mark from the marking crayon onto an article of fabric, and a kit that includes a plurality of fabric marking crayons, and an article made of fabric to which the crayon is applied. Crayon, as used herein, refers to a stick of wax composition, preferably colored, used for drawing and coloring.

The process for making permanent fabric marking crayons of the present invention includes blending a mixture of stearic acid, a triglyceride-containing mixture, and a coloring agent; heating the blended mixture; adding Carnauba wax to the heated blend; transferring the mixture to a mold; and removing the finished product once it has cooled. In one alternative embodiment, the process includes further blending plastisol screen printing ink into the mixture of stearic acid and the triglyceride-containing mixture. In this embodiment, the coloring agent is acceptably added with the ink or in addition to the ink or separately from the ink.

The triglyceride-containing mixture of the present invention includes the natural material, tallow, of an edible grade. By tallow is meant the fatty tissue of bovine cattle and sheep. Tallow typically contains oleic acid in a concentration range of 37-43%. Tallow also contains palmitic acid in a concentration of 24-32%, stearic acid in a concentration of 20-25%, myristic acid in a concentration of 3-6%, and linoleic acid in a concentration of 2-3%. Minor constituents of tallow include cholesterol, arachidonic, eladic and vaccenic acids. Edible tallow obtained from Patrick Cudahy, Inc. (Cudahy, Wis.) includes the following features: a free fatty acid value of 0.03; a peroxide value of 0.3; a color AOCS of 2.0 Yellow/0.3 Red, a propyl Gallate that is positive, and a positive butylated hydroxy anisole (BHA). Tallow used in the process of the present invention is most preferably deodorized and non-hydrogenated.

At room temperature, tallow has the consistency of a paste. Advantages of tallow having the properties described include that tallow makes a product that is soft and safe for children. The soft feature conferred by tallow to the crayon product renders the crayon pliable enough to impregnate fabric fibers with crayon material when the crayon contacts and marks the fabric. Within the marked region of fabric, the fibers of the fabric are encased with crayon material.

Other triglyceride-containing mixtures are suitable substitutes or supplements to the tallow material. One suitable material used as a substitute or supplement to tallow is a partially hydrogenated vegetable oil. Another suitable supplement or substitute material is lard. Lard typically has a saponification number of 193-200, an iodine value of 46-66, myristic acid concentration of 1-2%, palmitic acid of 28-30%, stearic acid of 12-18%, palmitoleic acid of 1-3%, oleic acid of 41-48%, and linoleic concentration of 6-7%.

While suitable, the vegetable oil and lard materials are not the most preferred materials of the present invention. Neither material confers the soft feature to the crayon product at the magnitude of tallow. Also, crayons made with partially hydrogenated vegetable oil are not as colorfast as those made with tallow.

The stearic acid component of the blended mixture permits the product of the present invention to grab fibers. Stearic acid is believed to add chemical "hooks" in the form of hydroxyl groups to the Carnauba wax of the present invention in order to confer a waterproofing feature to the crayon product. The stearic acid component of the blended mixture is also believed to confer wash resistance upon the final crayon product of the present invention. Stearic acid is preferably separately added to the blend in a concentration ranging from 0.01% to 5% of the total formulation weight. The most preferred concentration of stearic acid, separately added, is from 0.01% to 0.5% of the formulation weight.

The coloring agent blended with the triglyceride-containing mixture and stearic acid in the process of the present invention includes several embodiments. In one embodiment, the coloring agent blended is a soluble dye. In a second embodiment, the coloring agent is a dispersible pigment. One typical analysis of heavy metal concentrations in a dispersible pigment is shown in Table 1. The typical physical form of the soluble dye or dispersible pigment is a powder form.

TABLE 1

CHEMICAL ANALYSIS

| Parameter | Sample, ppm | LDL, ppm | Method Number* |
|---|---|---|---|
| Arsenic | 2.1 | 0.8 | 7060 |
| Barium | 42 | 1 | 6010 |
| Cadmium | ND | 1 | 7130 |
| Chromium | 2 | 2 | 7190 |
| Lead | 10 | 4 | 7420 |
| Mercury | ND | 0.08 | 7471 |
| Selenium | ND | 0.4 | 7740 |
| Silver | ND | 2 | 7760 |

*EPA Test Methods for Evaluating Solid Waste, SW-846, Nov 1986.
ND = Not Detectable In a third embodiment, the coloring agent is a non-toxic metallic bronzing powder material. The amount of bronzing powder blended depends upon the type of material simulated and the coarseness of the powder's grind. Suitable metallic powders include non-toxic aluminum, copper, copper alloys, and bronzes. Typically, metal particles are coated with a polymer to make a non-toxic grade. Alternatively, synthetic non-toxic materials are used to simulate metal particles.

The metal particle of the metallic powder is typically less than a micron in thickness and less than 50 microns in length. Smaller particles tend to have greater opacity and hiding power producing a grayish effect. Larger particle sizes show greater brightness and reflectivity. Leafing and non-leafing grades of metallic powders are acceptable.

In a fourth embodiment, the coloring agent blended with triglyceride-containing material and stearic acid includes a reflective powder. The reflective entity of reflective powder has a small particle size and very high reflectivity.

In a fifth embodiment, the coloring agent blended includes a fluorescent pigment. A fluorescent pigment absorbs visible or ultraviolet light and re-emits the absorbed energy at longer wavelengths. These pigments may appear to glow in daylight, as the emitted light combines with the reflected color of the crayon material.

The active part of fluorescent pigments generally consists of an organic molecule. Those that show fluorescence will also phosphoresce under certain conditions. Phosphorescence has an afterglow or prolonged emission, while fluorescence does not. Solvents and other solutes may cause quenching, a decrease in intensity of fluorescence. The daylight fluorescent pigment consists of the fluorescent compound combined with an appropriate matrix.

In a sixth embodiment, the coloring agent blended includes a phosphorescent pigment. Phosphorescent pigments are those in which excitation by a particular wavelength of visible or ultraviolet radiation results in the emission of radiation at a longer wavelength. Phosphorescence lasts beyond the extinction of the excitation radiation.

While some phosphorescent coloring agents of silicate types are in use (zinc or calcium compounds, with cationic impurities) the most common type employs a zinc sulfide structure with partial or complete substitution of the zinc by cadmium, calcium, or other divalent cation. Activators, including impurities that cause the defect structure in the crystal lattice, may be copper, manganese, and others.

Phosphorescent pigments yield greater brightness in the yellow-to-blue region. The blue region has the longest afterglow.

Once blended, the mixture of coloring agent, stearic acid, and triglyceride-containing mixture is then heated to a temperature within an approximate range of 225°–250° F. Once the blended mixture falls within this temperature range, Carnauba wax is added and the mixture is agitated for 2-to-3 minutes. Carnauba wax is added in an amount such that the ratio of weight of Carnauba wax to the combined weight of Carnauba wax plus triglyceride-containing mixture falls within a range of 0.15–0.35. In the most preferred embodiment, the ratio range is 0.20-to-0.25.

In the alternative embodiment of blending plastisol screen printing ink with the triglyceride-containing mixture, the blended mixture is heated to a temperature range of 190°–200° F. Carnauba wax is then added and the mixture is agitated for a period of less than 3 minutes.

The Carnauba wax reactant of the present invention is an exudate from the pores of the leaves of a Brazilian wax palm tree, Copernica, Cerifera, Prunae. Carnauba wax is typically rated according to an index into one of seven numbers ranging from 1 to 7. All grades of Carnauba wax are suitable reactants for the present invention. However, Carnauba wax having a low index number is preferred over Carnauba wax having a high index number. One preferred physical form of the Carnauba wax reactant includes wax flakes. Suitable properties for Carnauba wax used in the process of the present invention are listed in Table 2. One supplier of Carnauba wax is Strahl & Pitsch, Inc. (West Babylon, N.Y.). Other information sources for Carnauba wax include United States Pharmacopoeia/National Formulary; Food Chemicals Codex; Title 21 of the Code of Federal Regulations—Food & Drug Administration, as revised—21 CFR 175.320 and 21 CFR 184. (1978) which are herein incorporated by reference.

Carnauba wax is the most preferred wax base type for use in the present invention. The high melting point, 80°–87° C., hardness and high oil loading capability of Carnauba wax combine to make it well suited in the formulation of crayons of the present invention.

In evaluating waxes for use in the present invention, other waxes of relatively similar melting points such as Candelilla, paraffin, microcrystalline paraffin wax, were formulated in the same way as the Carnauba wax, that is, the ratio of weight of candelilla wax, or paraffin wax or microcrystalline paraffin wax to triglyceride-containing material was approximately 0.15 to 0.35. These waxes produced crayons of similar softness to the Carnauba-based formulation of the present invention. However, the surface of the crayon had a greasy feel making it unsuitable for labeling and generally unacceptable for consumer use. Further, except for the microcrystalline paraffin wax, none of the alternate waxes showed the retention of color and brightness compared with the Carnauba formulation.

| CARNAUBA WAX | |
|---|---|
| Specifications: | |
| *Melting Point - Minimum-- | 83.0° C. (181.4° F.) |
| Flash Point - ASTM D-92-78 - Minimum-- | 310.0° C. (590.0° F.) |
| *Volatile Matter (Moisture Included) - Maximum % -- | 2.0 |
| *Insoluble Impurities - Maximum %-- | 1.0 |
| *Acid Value -- | 2.0-6.0 |
| *Saponification Value -- | 78.0-88.0 |
| Paraffinic Hydrocarbons - ASTM D-1342-82 - Maximum % -- | 2.0 |
| *Acetone Soluble Resinous Matter - Maximum % at 15° C. -- | 5.0 |
| *AMERWAX Test Method -- Wax Sampling and Test Methods, Revised November 1960, American Wax Importers and Refiners Assn., Inc. | |

Once agitated, the hot mixture is transferred to a mold and allowed to cool. After cooling, the product is removed from the mold.

The product of the present invention is a crayon that permanently marks fabric. The crayon has a chemical composition such that the ratio by weight of Carnauba wax to Carnauba wax plus the triglyceride-containing mixture is from 0.15 to 0.35.

Below the range of 0.15 to 0.35., the crayon is too soft and breaks easily. This feature renders the product unsuitable for use by children particularly. Above this range, the crayon is too hard, resulting in poor coverage upon the fabric. In the most preferred embodiment, the ratio of Carnauba wax to the total weight of Carnauba wax and the triglyceride-containing mixture is from 0.20-to-0.25.

A sample of the product of the present invention made with deodorized tallow was analyzed in a Shimadzu C-R5A Chromatopac gas chromatograph. The chromatograph measured a spectrograph that is presented in tabular form in Table 3. The stearic acid peak occurred at 13.991 minutes (1 peak) and 14.283 minutes (1 peak). The tallow peak occurred at 16.578 minutes. Carnauba wax peaks occurred at 17.429, 18.254 and 19.046 minutes.

A sample of the present invention made with non-deodorized tallow was also analyzed in a Shimadzu C-R5A Chromatopac chromatograph. The chromatograph measured a spectrograph that is presented in tabular form in Table 4. The stearic acid peak occurred between 14.085 and 14.385 minutes (1 peak). The tallow peak occurred at 16.677 minutes. Carnauba wax peaks occurred at 17.523 minutes, 18.340 minutes, and 19.129 minutes.

TABLE 3

| SPECTROGRAPH | |
|---|---|
| Time (Minutes) | Milligrams |
| 0.389 | 28.5123 |
| 0.450 | 36.3167 |
| 7.995 | 0.0354 |
| 9.352 | 0.1949 |
| 10.2 | 0.2656 |
| 10.942 | 0.0843 |
| 11.326 | 0.0433 |
| 12.297 | 2.2404 |
| 13.065 | 0.0596 |

TABLE 3-continued

| SPECTROGRAPH | |
|---|---|
| Time (Minutes) | Milligrams |
| 13.348 | 0.1289 |
| 13.991 | 2.3629 |
| 14.283 | 5.0382 |
| 14.785 | 0.9997 |
| 15.698 | 0.8475 |
| 16.578 | 9.7764 |
| 17.429 | 4.1702 |
| 18.254 | 5.2988 |
| 19.046 | 3.6351 |

TABLE 4

| SPECTROGRAPH | |
|---|---|
| Time (Minutes) | Milligrams |
| 7.301 | 0.0319 |
| 9.419 | 0.0835 |
| 9.687 | 0.1046 |
| 10.243 | 0.3838 |
| 10.955 | 0.092 |
| 11.368 | 0.0558 |
| 11.995 | 0.0389 |
| 12.386 | 2.5174 |
| 13.13 | 0.1004 |
| 13.423 | 0.1797 |
| 14.085 | 1.1547 |
| 14.385 | 5.0267 |
| 14.902 | 0.5159 |
| 15.351 | 0.1136 |
| 15.806 | 1.2664 |
| 16.677 | 11.0529 |
| 17.523 | 3.3506 |
| 18.34 | 4.4939 |
| 19.129 | 2.7108 |
| TOTAL 20 | TOTAL 100 |

The product of the present invention further includes a coloring agent. Suitable concentrations of the coloring agent range from 0.01% to 50% of the total crayon weight. One suitable group of coloring agents includes soluble dyes. A preferred concentration of soluble dye colorant is 0.01%-to-5% of the total crayon weight. The most preferred concentration ranges from 0.1% to 1.0% of the total crayon weight. Suitable soluble dyes include but are not limited to Victoria Blue B dye powder.

One other group of suitable coloring agents include dispersible pigments. The preferred concentration of dispersible pigments ranges from 0.5% to 50% of the crayon weight. The most preferred concentration of dispersible pigment coloring agent ranges from 1%-to-30% of the total crayon weight. Suitable dispersible pigments include but are not limited to C.I. Disperse Blue 3 #61505 subliminal dye powder.

Another group of color agents include fluorescent pigments. Other suitable coloring agents include phosphorescent pigments, bronzing pigments, and other metallic pigments, and reflective particles embedded in the product of the present invention.

Specific preferred pigments for the present invention include: EPO Color Types FP-10, FP-20, FP-30, FP-40, FP-101, FP-112HD, FP-113HD, FP-114HD, FP-115HD, FP-116HD, FP-117HD, FP-3000, FP-3030, FP-2020, FP-205CN, FP-100CH, FP-2515, FP-1007, FP-1025, FP-1050.

The product of the present invention has a color fastness of 4-5, measured on a Grayscale Classification scale. The Grayscale measures the degree of fading of a color according to an index ranging from 1-to-5. A rating of 1 indicates a high degree of fading. A rating of 5 indicates a low degree of fading. For the present invention, the Grayscale test was performed on crayon-treated fabric swatches that had each undergone one of a battery of tests. The tests performed included AATCC Test Methods 61, 3A, 2A and 1A herein incorporated by reference. The AATCC stands for the American Association of Textile Chemists and Colorists.

To prepare a sample for testing, fabric swatches were contacted with the crayon of the present invention. The contacted area was then covered with a sheet of bond paper and heated to a temperature of 350°–375° F. with an iron. Upon cooling, the paper was removed from the crayon-contacted area of the fabric. The fabric was then sprayed with a household stain remover treatment (Shout® brand, Johnson & Company, Racine, Wis.) and laundered in accordance with the specific test procedures.

In one preferred embodiment, the product of the present invention has a cylindrical shape. In particular, the crayon product is tapered at one end to a blunt point. The tapered end is used for applying the crayon product onto a fabric surface.

The crayon of the present invention is a fabric marking crayon. The crayon is not a preferably paper marking crayon. When contacted with paper, the crayon makes a mark that readily smears.

The present invention further includes a method for adhering the crayon product to a fabric surface in order to create a permanent mark upon the fabric. In the first step of the method, the crayon is contacted to a surface of a fabric to a degree that marks the fabric with the color from the crayon. Within the mark, the crayon material impregnates the fabric and encases fabric fibers. The color of the crayon is carried in a matrix that includes Carnauba wax, triglycerides, preferably from tallow, and stearic acid. In one alternative embodiment, the color is carried in a matrix that additionally includes a plastisol screen printing ink.

The fabric material is then covered with a sheet of bond paper. The bond paper absorbs crayon material not impregnated into the fabric. The bond paper also prevents smearing of the crayon material on the fabric. The marked fabric material covered with bond paper is then heated to a temperature approximately within the range of 350°–375° F. for a time period of about 30 seconds. In one embodiment, heating is performed by pressing a hot iron over the paper.

Once the time for heating is passed, the heat source is removed from the paper and the bond paper is removed from the underlying fabric to which the crayon was applied. Once cooled, the color is fixed into the fabric matrix.

Exactly how the crayon material of the present invention colors the fabric is unknown. However, it is believed that the pigment or dye is gasified upon heating and diffuses into the fibers of the fabric along with the Carnauba wax, triglyceride-containing mixture, and stearic acid carrier. The Carnauba wax, which has been treated with stearic acid, is believed to contain the equivalent of "chemical hooks" suspected to be hydroxyl groups. The chemical "hooks" facilitate the bonding of the dye or pigment to the fibers of fabric.

In the case of the alternative embodiment, the plastisol is fused into a solid form by application of heat that "burns off" the plastisizers. During heating, the plastisol actually bonds to fibers of the fabric. For either embodiment, the combination of dye, Carnauba wax, triglyceride-containing mixture, stearic acid and heat confer a durability to the color of the treated fabric not observed in previous applications of crayons to fabric.

The kit of the present invention includes a number of embodiments. In one embodiment, the kit includes a plurality of crayons of the present invention of different colors and a fabric article to which the crayons are contacted. Preferably, the crayons are packaged in a container that is at least partially transparent so that crayon colors are observable. It is also preferred that the fabric article of the present invention include an article of clothing. In one embodiment, the article of clothing is a T-shirt. Other articles of clothing included in the kit of the present invention include but are not limited to bibs, sweatshirts, pants, hats and diapers. In one preferred embodiment, the articles of clothing contain an illustration. The illustration is preferably colored using the crayons of the present invention.

Fabric articles alternatively embodied within the kit of the present invention include but are not limited to pillow cases, curtains, towels, flags, banners and cloth handbags. In one preferred embodiment, the fabric article contains an illustration. The illustration is preferably colored using crayons of the present invention. The fabric article includes either natural fabrics such as cotton, man-made fabrics such as polyester or a combination of natural and man-made fabrics.

In one preferred embodiment, the kit of the present invention is held together by a clothes hanger. The fabric article is hung from the hanger. The crayons are contained within a transparent package, attached to a flexible package hung from the hanger.

In an alternative embodiment, the kit of the present invention includes a plurality of crayons of the present invention and at least one heat transfer sheet. Also, the kit includes an embodiment having a plurality of heat transfer sheets. Additionally, the kit includes an embodiment where heat transfer sheets enclose the plurality of crayons and package the crayons. The heat transfer sheet includes bond paper or French paper. In one preferred embodiment, the heat transfer sheet includes plastisol, screen printing ink forming an image on the sheet. The image on the heat transfer sheet is transferred to an article of fabric upon contact with fabric at the application of heat. The kit of the alternative embodiment also includes, in one embodiment, an article of fabric.

In another alternative embodiment, the kit of the present invention includes a plurality of crayons of the present invention and a stencil having a plurality of images. The stencil is preferably made of heavy paper or plastic.

The following examples are for illustrative purposes only and are not to be construed as limiting the present invention in any way.

EXAMPLE 1

7.5 grams of deodorized tallow (non-hydrogenated, supplied by Patrick Cudahy Inc., Cudahy, Wis.), 0.25 grams of reagent grade Stearic Acid and 0.20 grams of Victoria Blue B dye powder were mixed at room temperature to disperse the solids into the tallow paste. 2.5 grams of Carnauba #1 Yellow Wax flakes (supplied by Strahl and Pitsch Inc., West Babylon, N.Y.) were then added and the mixture was placed on an electric hot plate. After stirring for 2–3 minutes and bringing the mixture to approximately 225°–250° F., a homogenous liquid mixture was formed. The mixture was then poured into a ¼ inch diameter tubular mold made of polyester film and allowed to cool at room temperature. After cooling for 1 hour, the solidified crayon was removed from the mold. The resulting crayon was not easily broken and had a surface that was not greasy to the touch. On marking 100% cotton and 50/50% cotton/polyester fabric swatches with the crayon, good coverage and penetration into the fabric surface was observed.

Next, the fabric swatches were covered with a sheet of copy bond paper and heated to a temperature of between 350°–375° F. with a hand-held iron using medium-to-firm pressure. After cooling, the colored area of the fabric was sprayed with a household stain remover treatment (Shout ® brand, Johnson & Company, Racine, Wis.) and laundered in 120°–130° F. water containing recommended quantities of a household detergent (powdered Tide ® brand, Procter & Gamble, Cincinnati, Ohio) and non-chlorinated dry bleach (Clorox ® brand, Procter & Gamble, Cincinnati, Ohio). The laundering was done in a Sears Kenmore ® Model No. 70 washer using the 10 permanent press cycle. After drying, the fabric markings showed excellent color retention and brightness compared to unwashed control samples. After five additional washings, only minimal additional loss of color and brightness occurred in the samples.

EXAMPLE 2

The same procedures and ingredients as Example 1 were used, except that 0.3 grams of C.I. Disperse Blue 3 #61505 subliminal dye powder were substituted for the Victoria Blue B dye powder. Again, minimal additional loss of color and brightness occurred in the samples after a total of six washings.

Although the present invention has been described with reference to preferred embodiments, workers skilled in the art will recognize that changes may be made in form and detail without departing from the spirit and scope of the invention.

What is claimed is:

1. A process for making a crayon comprising:
   blending a coloring agent and stearic acid into a triglyceride-containing material at ambient temperature to form a blended mixture;
   heating the blended mixture at a temperature within the approximate range of 225°–250° C. to form a heated mixture;
   adding Candelilla wax to the heated mixture;
   transferring the heated mixture to a mold; and
   removing the finished product once it has been cooled.

2. A product produced by the process of claim 1.

3. A crayon product comprising a mixture of Candelilla wax, stearic acid, triglyceride-containing material, and a coloring agent, wherein the ratio of weight of Candilla wax to the combined weight of Candilla wax and triglyceride-containing material is approximately 0.15 to 0.35.

4. A process for making a crayon comprising:
   blending a coloring agent and stearic acid into a triglyceride-containing material at ambient temperature to form a blended mixture;
   heating the blended mixture at a temperature within the approximate range of 225°–250° F. to form a heated mixture;
   adding paraffin wax to the heated mixture;
   transferring the heated mixture to a mold; and
   removing the finished product once it has been cooled.

5. A product produced by the process of claim 4.

6. A crayon product comprising a mixture of paraffin wax, stearic acid, triglyceride-containing material, and a coloring agent, wherein the ratio of weight of paraffin wax to the combined weight of the paraffin wax and triglyceride-containing material is approximately 0.15 to 0.35.

7. A process for making a crayon comprising:
   blending a coloring agent and stearic acid into a triglyceride-containing material at ambient temperature to form a blended mixture;
   heating the blended mixture at a temperature within the approximate range of 225°–250° F. to form a heated mixture;
   adding microcrystalline paraffin wax to the heated mixture;
   transferring the heated mixture to a mold; and
   removing the finished product once it has been cooled.

8. A product produced by the process of claim 7.

9. A crayon product comprising a mixture of microcrystalline paraffin wax, stearic acid, triglyceride-containing material, and a coloring agent, wherein the ratio of weight of microcrystalline paraffin wax to the combined weight of the microcrystalline paraffin wax and triglyceride-containing material is approximately 0.15 to 0.35.

* * * * *